United States Patent
Buckley et al.

(10) Patent No.: US 8,351,919 B2
(45) Date of Patent: Jan. 8, 2013

(54) APPARATUS, AND ASSOCIATED METHOD, BY WHICH TO STORE SPECIFIC NETWORK IDENTIFIERS AT A WIRELESS DEVICE

(75) Inventors: Adrian Buckley, Tracy, CA (US); Bokinakere Subbarao Sundresh, Basingstoke (GB)

(73) Assignee: Research In Motion Limited, Waterloo (CA)

( * ) Notice: Subject to any disclaimer, the term of this patent is extended or adjusted under 35 U.S.C. 154(b) by 1086 days.

(21) Appl. No.: 11/551,818

(22) Filed: Oct. 23, 2006

(65) Prior Publication Data

US 2008/0096548 A1  Apr. 24, 2008

(51) Int. Cl.
H04W 4/00 (2009.01)

(52) U.S. Cl. .............. 455/422.1; 455/432.1; 455/558

(58) Field of Classification Search .............. 455/422.1, 455/425, 432.1, 558
See application file for complete search history.

(56) References Cited

U.S. PATENT DOCUMENTS

| | | | | |
|---|---|---|---|---|
| 5,819,282 | A * | 10/1998 | Hooper et al. | 707/103 R |
| 5,966,702 | A * | 10/1999 | Fresko et al. | 707/1 |
| 2001/0014976 | A1* | 8/2001 | Roop et al. | 725/91 |
| 2003/0054809 | A1 | 3/2003 | Bridges et al. | |
| 2003/0167306 | A1* | 9/2003 | Kaplan | 709/205 |
| 2004/0176024 | A1* | 9/2004 | Hsu et al. | 455/3.04 |
| 2005/0147073 | A1* | 7/2005 | Hietalahti et al. | 370/338 |
| 2006/0111107 | A1* | 5/2006 | Zhang | 455/435.2 |
| 2006/0286977 | A1* | 12/2006 | Khandelwal et al. | 455/432.1 |
| 2008/0064393 | A1* | 3/2008 | Oommen et al. | 455/432.1 |

FOREIGN PATENT DOCUMENTS

WO   WO 2006/138338 A2   12/2006

OTHER PUBLICATIONS

"Universal Mobile Telecommunications System (UMTS)"; 3GPP system to Wireless Local Area Network (WLAN) interworking; WLAN User Equipment (WLAN UE) to network protocols; Stage 3 (3GPP TS 24.234 version 7.3.0 Release 7), ETSI TS 124 234 v7.3.0 (Sep. 2006), European Telecommunications Standards Institute, Sophia-Antipo, FR, XP014035498, p. 6, line 1—p. 13, line 21, p. 20, lines 11-31.

"Universal Mobile Telecommunications System (UMTS)"; Characteristics of the Universal Subscriber Identity Module (USIM) application (3GPP TS 31.102 version 7.6.0 Release 7), ETSI TS 131 102 v7.6.0 (Sep. 2006), XP014035681, p. 14, p. 115-p. 117, p. 145.

* cited by examiner

*Primary Examiner* — Kamran Afshar
*Assistant Examiner* — Yousef Rod

(57) ABSTRACT

Apparatus, and an associated method, for facilitating selection of a I-WLAN, or other network, by a wireless device. An electronic storage element is provided. A listing of specific network identifiers is stored at the electronic storage element. And, a listing indicia identifier is also stored at the electronic storage element. The listing indicia identifier is configured to identify formatting of the specific network identifiers. Formatting of the information permits compliance with 3GPP TS 31.102 [13] that requires that at least ten WSID entries to be storable at a WSID list.

18 Claims, 5 Drawing Sheets

FIG. 2

| IDENTIFIER: '4F44' | STRUCTURE: LINEAR FIXED | OPTIONAL |
|---|---|---|
| SFI: '04' | | |
| RECORD SIZE: X+1 BYTES | | |
| ACCESS CONDITIONS:<br>　READ　　　　　PIN<br>　UPDATE　　　　PIN<br>　DEACTIVATE　　ADM<br>　ACTIVATE　　　ADM | UPDATE ACTIVITY: LOW | |

| BYTES | DESCRIPTION | M/O | LENGTH |
|---|---|---|---|
| 1-2 | LENGTH OF WSID | M | 2 BYTES |
| 3 TO X + 1 | WSID | M | X BYTES |

FIG. 3

| IDENTIFIER: '4F44' | STRUCTURE: LINEAR FIXED | OPTIONAL |
|---|---|---|
| SFI: '04' | | |
| RECORD SIZE: X+1 BYTES | | |
| ACCESS CONDITIONS:<br>　READ　　　　　PIN<br>　UPDATE　　　　PIN<br>　DEACTIVATE　　ADM<br>　ACTIVATE　　　ADM | UPDATE ACTIVITY: LOW | |

| BYTES | DESCRIPTION | M/O | LENGTH |
|---|---|---|---|
| 1 | NUMBER OF WSID | M | 1 BYTE |
| 2 TO X + 1 | WSID | M | X BYTES |

38

| IDENTIFIER: '4F44' | STRUCTURE: LINEAR FIXED | | OPTIONAL |
|---|---|---|---|
| SFI: '04' | | | |
| RECORD SIZE: X+1 BYTES | | UPDATE ACTIVITY: LOW | |
| ACCESS CONDITIONS:<br>   READ         PIN<br>   UPDATE     PIN<br>   DEACTIVATE ADM<br>   ACTIVATE   ADM | | | |
| BYTES | DESCRIPTION | M/O | LENGTH |
| 1 | NUMBER OF WSID | M | 1 BYTE |
| 2 | LENGTH OF WSID1 | M | 1 BYTE |
| 3 TO X | WSID1 | M | X BYTES |
| X + 1 | LENGTH WSID2 | M | 1 BYTE |
| X + 2 TO Y | WSID2 | M | Y BYTES |

FIG. 4

APPARATUS, AND ASSOCIATED METHOD, BY WHICH TO STORE SPECIFIC NETWORK IDENTIFIERS AT A WIRELESS DEVICE

The present invention relates generally to a manner by which to select a network, such as a WLAN (Wireless Local Area Network), with which a wireless device, such as a UE (User Equipment) communicates. More particularly, the present invention relates to apparatus, and an associated method, by which to store identifiers that identify networks with which the wireless device is permitted to communicate.

Data relating to the identifiers is stored in permanent, or removable, memory at the wireless device, formatted in manners that facilitate retrieval and identification of the identifiers.

BACKGROUND OF THE INVENTION

Communications by way of cellular communication systems, e.g., is pervasive and, in some areas, the number of users of cellular communication systems approaches, or exceeds, the number of users of conventional, wireline communication systems.

Successive generations of cellular communication systems have been developed and deployed. Additionally, other mobile communication systems that share some of the characteristics of cellular communication systems have also been developed and deployed. Wireless local area networks (WLANs) are mobile communication systems that operate, at least in some manners, analogous to operation of cellular communication systems. Some WLANs are constructed to be operable in general conformity with the IEEE 802.11 family of standards. Wireless local area networks are generally implemented as small-area systems that encompass areas generally smaller than the areas encompassed by cellular communication systems.

Various standard promulgations are under consideration and others have been added to the existing set of standards. For instance, technical standard TS 33.102 [1] version 7.4.0 pertains to I-WLAN (interworking wireless local area network) selection. The wireless device, viz., the user equipment, is sometimes positioned at a location that is encompassed by the coverage areas of more than one wireless local area network. Selection must be made of with which, if any, of the WLANs that the UE shall communicate. The aforementioned technical specification defines a user controlled WLAN specific identifier list (EF-UWSIDL) and an operator controlled WLAN specific identifier list (EF-OWSIDL). The lists form files that are stored at the UE, e.g., at the (U)SIM or in memory or copied from the (U)SIM into the UE memory. And, the identifiers of the list or lists stored at the UE are accessed and used in the selection process. The files have two fields, the first of which identifies the total length of the file and the second is the SSID (Service Set Identifier), coded as binary.

An SSID is an element of a length of between 0 and 32 bytes. A potential problem with the existing technical standard promulgation results as it presently is not possible to determine how many SSIDs have been coded on the (U)SIM for the reason that the SSIDs are not of fixed lengths, but, rather, are of any of the 0-32 byte lengths. The UE that accesses and reads the data forming the relevant WSID list is at risk of incorrectly decoding the stored information.

Additionally, technical specification TS 24.234, which also pertains to network selection, requires that at least ten SSIDs shall be storable at the relevant WSID list. However, only one byte is allocated to define the length. As a result, only 256 bytes can exist in the file. If the SSIDs are all of thirty-two byte lengths, only eight entries are storable, contrary to the requirements of the TS 24.234 specification.

A manner is therefore required by which better to store the data forming the WSID list, or other specific network identifier list so that an appropriate number of entries are storable thereon while also permitting the UE, or other wireless device, to decode the stored data.

It is in light of this background information related to network selection in a radio communication system that the significant improvements of the present invention have evolved.

BRIEF DESCRIPTION OF THE DRAWINGS

FIG. 2 illustrates a representation of the format of a file including a WSID list formed pursuant to an embodiment of the present invention.

FIG. 3 illustrates a representation, similar to that shown in FIG. 2, but here of the formatting of a file including a WSID list formed pursuant to another embodiment of the present invention.

FIG. 4 illustrates a representation of a file including a WSID list, similar to those shown in FIGS. 2-3, but here formed pursuant to another embodiment of the present invention.

DETAILED DESCRIPTION

Figure 1:
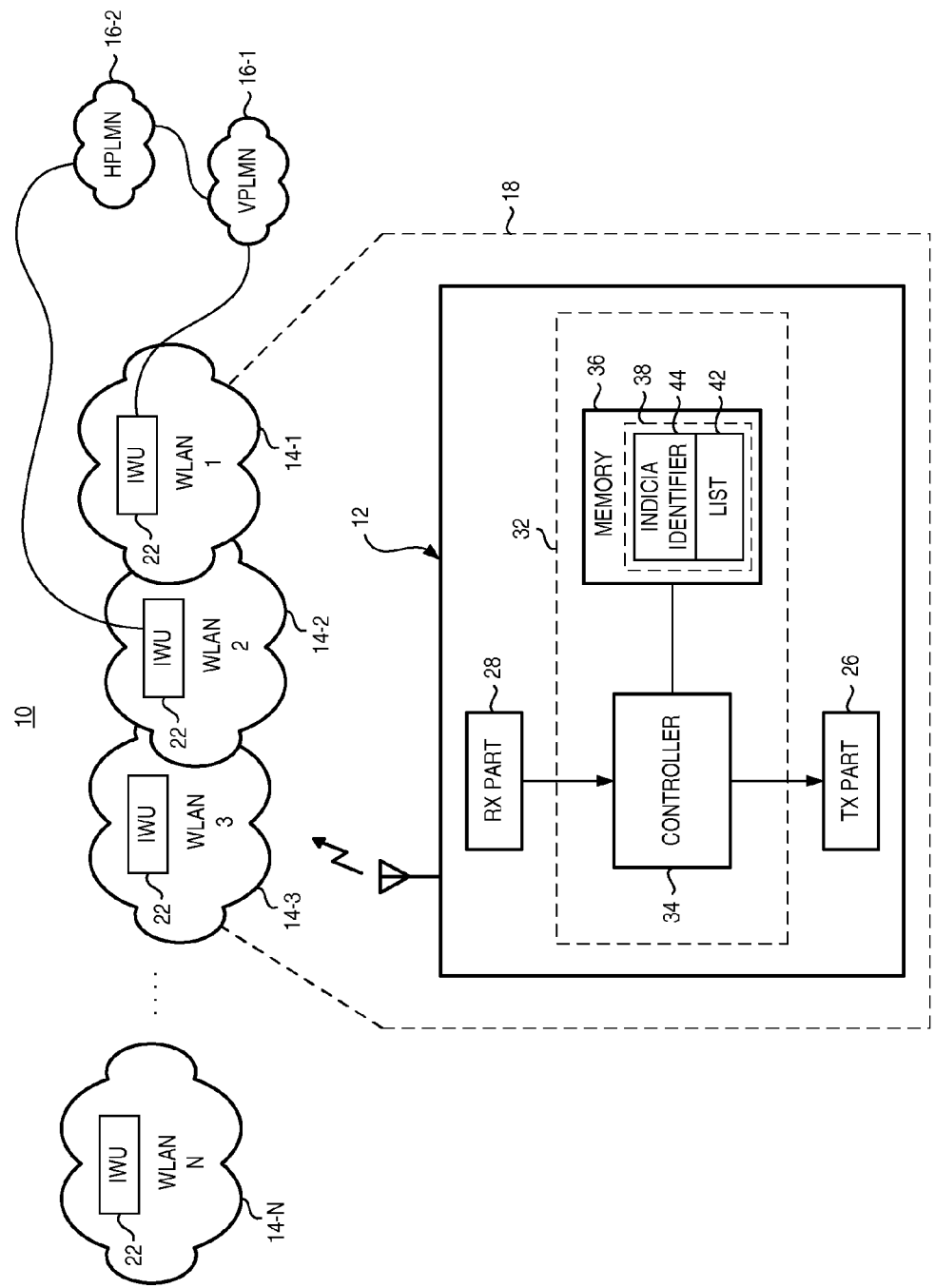
FIG. 1 illustrates a functional block diagram of a multiple network communication system in which an embodiment of the present invention is operable.

The present invention, accordingly, advantageously provides apparatus, and an associated method, by which to select a network, such as a WLAN, with which a wireless device communicates.

Through operation of an embodiment of the present invention, a manner is provided by which to store identifiers that identify networks with which the wireless device is permitted to communicate. These identifiers could identify WLAN's or even WiMax or other types of wireless networks.

In one aspect of the present invention, data relating to the identifiers is stored in permanent, or removable, memory at the wireless device e.g. (U)SIM, R-UIM, Compact Flash, Micro SD card, Memory stick etc. The data is formatted in manners that facilitate retrieval and identification of the identifiers. When implemented at a UE operable in a multiple WLAN system, the data is formatted in a manner that permits the requirements of technical specification TS 24.234 [2].

In another aspect of the present invention, a file containing a WSID list is formed at a SIM (Subscriber Identity Module), a USIM (UMTS Subscriber Identity Module), at a R-UIM (Reusable Identification Module), a compact flash card, an SD (Secure Digital) card, a permanent random access memory (RAM), or any other appropriate electronic, or other, memory element. When selection is to be made of a network with which the wireless device is to communicate, a WSID, or other specific network identifier, list, embodied at the memory element, is accessed and its contents are used in the network selection. A memory card reader, or other accessor, is embodied at the wireless device and used to access the list stored at the memory element. In another aspect, the UE could copy all of the information from said removable memory module into memory of the device. Either, or both, a user controlled WLAN specific identifier list or an operator controlled WLAN specific identifier list is created and maintained at the memory element, accessible, as needed, in the network selection when the wireless device is to select a network with which to communicate amongst, e.g., multiple, available networks.

In another aspect of the present invention, a file including the WSID list allocates its first two bytes of data to identify the length of the WSID list or file. The third, and following, bytes of the file including the WSID list identify the WSIDs, or other specific network identifiers. Individual ones of the specific network identifiers are separated by delimiters, such as delimiters of "FF" values.

In an alternate aspect of the present invention, the file including the WSID list is formatted such that a first byte of the list identifies the number of WSIDs, or other specific network identifiers, that populate the list. The second, and subsequent bytes of the file forming the WSID list are of values of individual WSIDs, or other specific network identifiers. Individual ones of the specific network identifiers are separated by delimiters, such as delimiters of "FF" values.

In another, alternative aspect of the present invention, a first byte of the file including the WSID list is used to identify the number of WSIDs, or other specific network identifiers, that are contained in the list. A second of the bytes of the file is used to identify the length of a following, associated WSID, or other specific network identifier. Successive pairings of identifier lengths and identifiers, together, collectively, of the number corresponding to the number populating the first byte form the WSID list. That is to say, subsequent to the first byte, the file is structured to be coded as length, data pairs. Each individual specific network identifier is of any of the zero to thirty-two byte lengths.

In another, alternate aspect of the present invention, the file including the WSID, or other specific network identifier, list is structured to be coded in the form of length, data. Successive WSID, or other specific network identifier, objects are defined. Each object is formatted to include, as its first byte, a length of an associated WSID, or other specific network identifier, followed by the specific network identifier. Again, the first byte of each object identifies length and subsequent bytes of each object identifies the data, i.e., the value of the identifier.

In another alternative aspect of the present invention, the file including the WSID, or other specific network identifier, list is formatted such that a first pair of bytes of the file defines the length of the file. And, a length-byte is associated with each successive specific network identifier contained in the list.

Thereby, through formation, and maintenance, of a file including a specific identifier list together with indicia identifiers identifying, e.g., the length of the list or the number of identifiers contained in the list, the list conforms to the requirements of an appropriate technical specification even if the lengths of all of the specific network identifiers are of maximum byte lengths.

In these and other aspects, therefore, apparatus, and an associated method, is provided for facilitating network selection. An electronic storage element is permitting of storage of data. A listing of specific network identifiers is stored at the electronic storage element. Each specific network identifier identifies a network permitted to be selected. A listing indicia identifier is also stored at the electronic storage element. The listing indicia identifier is configured to identify formatting of the specific network identifiers stored at the electronic storage element.

Referring, therefore, first to FIG. 1, a communication system, shown generally at 10, provides for radio communications with wireless devices, of which the wireless device 12 is representative. In the exemplary implementation, the communication system includes parts that are operable in general conformity with the IEEE 802.11 family of standards but the wireless networks 14-1, 14-2, 14-3 could be other forms of wireless networks such as Wimax, 3GPP2 standards, BRAN etc. And, the wireless device 12 shall, at times, be referred to as a UE (User Equipment). And, in the exemplary implementation, other parts of the communication system are operable pursuant to a new-generation, cellular communication standard, such as a 3GPP or 3GPP2 compliant system. In this exemplary implementation, the wireless device forms a multi-mode device operable to communicate pursuant to more than one communication standard, that is to say, the IEEE 802.11 standard and a cellular-system standard. The following description shall describe exemplary operation with respect to operation of the UE in conformity with the IEEE 802.11 communication specification family and a cellular system standard. Such an implementation is, of course, exemplary. And, embodiments of the present invention are analogously implementable in other types of radio communication systems in similar manner. For instance, in one alternate embodiment, for instance, parts of the communication system are operable pursuant to a WiFi communication standard. Operation of an embodiment of the present invention in such an alternate implementation is analogous to the operation that shall be described below.

The communication system includes network infrastructure, here formed of multiple networks. Some of the networks are operable pursuant to a wireless local area network operating standard, here, e.g., the IEEE 802.11(b) operating standard. Others are operable pursuant to a cellular communication system operating standard, here, e.g., a 3GPP operating standard.

In the exemplary representation of FIG. 1, four wireless local area networks 14 are shown. And, two cellular communication system networks 16 are shown. Three of the wireless local area networks 14, networks 14-1, 14-2, and 14-3, are deployed in manners that encompass a common area, represented by the area within the block 18. The wireless local area network 14-n is representative of a network that encompasses another area.

The wireless local area networks 14 each include interworking units (IWUs) 22 that facilitate interworking between their associated wireless local area networks and the cellular communication system networks 16. In the exemplary implementation illustrated in FIG. 1, the local area network 14-1 is directly connected to the cellular system network 16-1, here identified as a VPLMN (Visited Public Land Mobile Network). And, the wireless local area network 14-2 is directly connected to the cellular system network 16-2, here identified as a HPLMN (Home Public Land Mobile Network). The networks 16-1 and 16-2 are connected. Interworking between the networks 14 and the networks 16 is provided through operation of the interworking units 22 of the respected wireless local area networks.

The UE includes transceiver circuitry, here represented by a transmit (Tx) part 26 and a received (Rx) part 28. The transceiver circuitry is operable in conventional manner pursuant to operating protocols set forth in the aforementioned, or other, communication standard specification.

When positioned as illustrated within the coverage area 18, the user equipment 12 is able to communicate with any of the wireless local area networks 14-1, 14-2, and 14-3. Pursuant to an embodiment of the present invention, the wireless device 12 further includes apparatus 32 of an embodiment of the present invention that facilitates selection of the network 14 with which the user equipment shall communicate.

The apparatus 32 includes a controller 34 and a memory element 36. The controller 34 operates as an accessor, or reader, that accesses and reads data stored at the memory element 36 pursuant to selection of the network with which the user equipment shall communicate. One or more files, formatted in conformity with an embodiment of the present invention, is created and maintained at the memory element 36. In the exemplary implementation, the file includes a TS 33.102 [1], version 7.4.0-defined, user controlled WLAN specific identifier list, (EFUWSIDL) or an operator controlled WLAN specific identifier list (EFOWSIDL). In a further implementation, the memory element includes files forming both types of lists. Note that the files can be stored on removable memory as per TS 33.102 but the UE copies all the files into its local memory.

A file, here shown at 38, includes a WSID list 42 and one or more listing indicia identifiers 44 associated with the list, or entries thereon. The memory locations of the memory element 36 at which the file 38 is maintained is accessed by the controller pursuant to network selection procedures. In one implementation, the controller compares indications of available networks detected by the receive part 28 with entries on the WSID list 42 and responsive to comparisons there between, the controller selects with which of the networks that the user equipment shall communicate. Appropriate operation of the transceiver circuitry of the user equipment is caused to be commenced to communicate by way of the selected network. In the exemplary implementation, the list 42 contains entries that identify WSIDs that are formed of IEEE 802.11-defined SSID (Service Set Identifier) values. In other implementations, other types of specific network identifiers populate the list 42 such as those used for 802.16 etc. Formatting of the file permits the requirements set forth in 3GPP technical specification TS 31.102 [13] to be achieved.

Turning next to FIG. 2, the formatting of the file 38 maintained at the memory element 36 pursuant to a first embodiment of the present invention is shown. The file includes identifier, structure, and optional fields 52, 54, and 56, followed by an SFI field 58, a record size field 62, and an update activity field 64. And, following the update activity field 64, an access conditions field 66 is further included.

Such fields are then followed with a two-byte field 68 that identifies a WSID list length. And, the WSID list 72 follows the field 68. Individual WSID values are separated by delimiters of "FF" values. In the exemplary implementation, the WSID values are formed of SSID1 or SSID2 values, coded in conformity with 3GPP TS 23.038. Such codings could be 7 or 8 bit or any other type of coding as identified in TS23.038. When the resultant file is stored at the memory element, the user equipment is able to read the file from the memory element. The first and second bytes that form the field 68 indicate the length of the file. And, the third through the X+1 bytes contain the WSIDs coded as per TS 23.038. And, as noted, the occurrence of an FF in a byte shall indicate the end of that WSID. The length populating the field 68 forms the identifier indicia used by the controller pursuant to access of the WSID list 72.

FIG. 3 illustrates the file 38 of another embodiment of the present invention. The fields 52-66 shown previously in FIG. 2 are again illustrated to form part of the file 38 of the implementation of FIG. 3. Here, a field 74 is utilized to contain the indicia identifier. The indicia identifier identifies the number of WSIDs that are contained in the WSID list 72. Again, in the exemplary implementation, delimiters, such as the values "FF", separate individual WSIDs of the list. The entries of the WSID field are coded, e.g., as SMS default seven-bit coded alphabet values as defined in the 3GPP technical specification TS 23.038 [5] with bit number 8 set to zero. A string is further left-justified. And, again, the values of the WSIDs are SSID1 or SSID2 coded values, coded as per TS 23.038.

FIG. 4 illustrates a file 38 pursuant to another alternate embodiment of the present invention. Here, again, the fields 52-66 are shown. In this embodiment, a field 74 is again utilized. The field 74 is of a single byte length and is populated with a value identifying the number of WSIDs that are contained in the WSID list 72. Here, the WSID list is structured in the form of length, data. That is to say, prefacing each WSID is a byte 76 that identifies the length of the associated WSID. Thereby, both the number of WSIDs and each of their lengths is identified in the file. Delimiters are not required for the reason that the lengths, defined, e.g., in terms of byte lengths, for each of the WSID values is indicated. The WSID field is coded, e.g., as SMS default seven-bit coded alphabet as defined in 3GPP TS 23.038 [5] with bit number eight set to zero. The string is left-justified.

Figure 5:
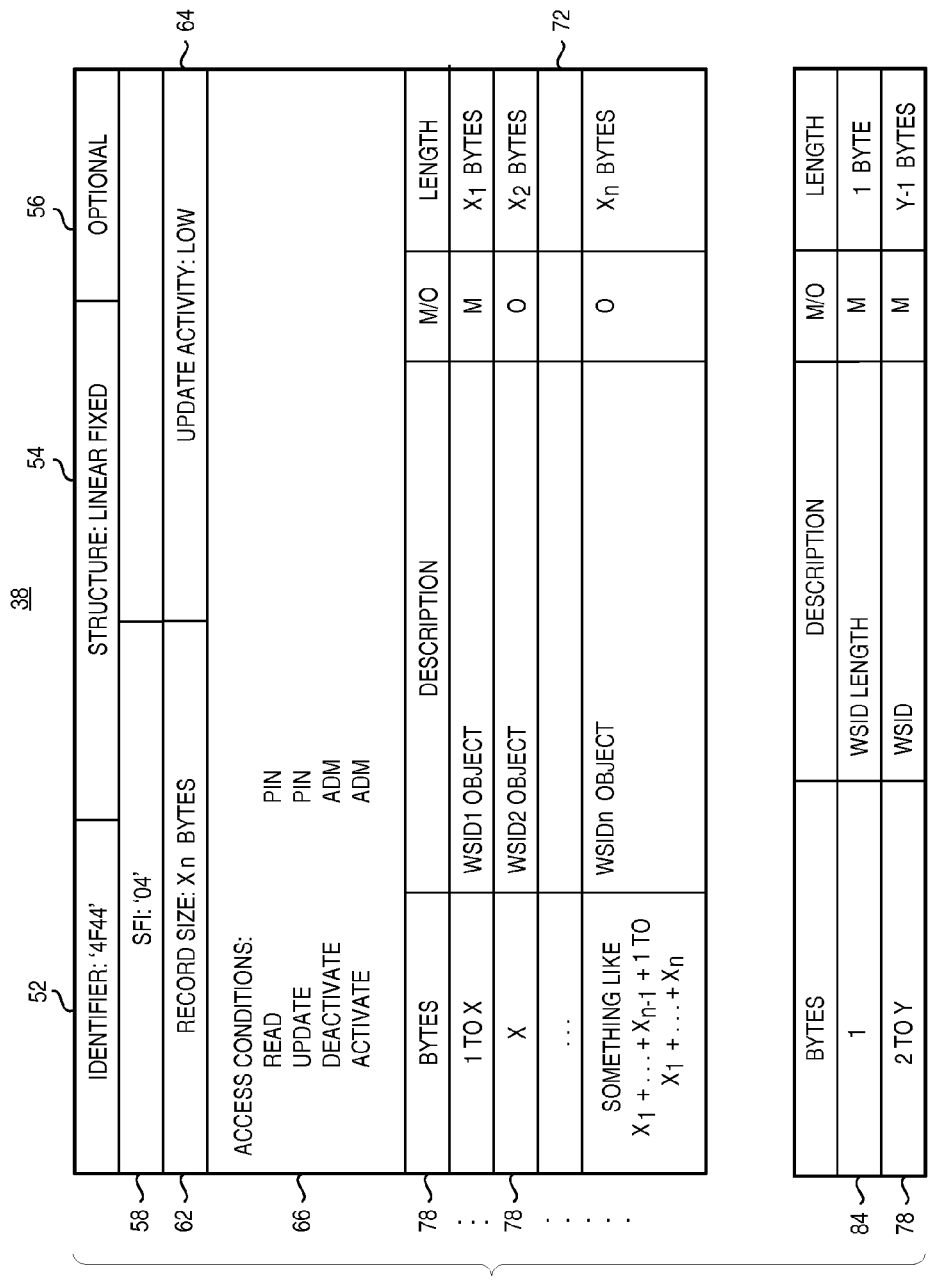
FIG. 5 illustrates a representation, similar to those shown in FIGS. 2-4, but here of a file including a WSID list formed pursuant to operation of another embodiment of the present invention.

FIG. 5 illustrates the file 38 of another alternate implementation. The file again includes the fields 52-66. Here, the WSID field 72 is coded as length, data, containing successive WSID objects 78. An exemplary object 78 is shown at the bottom portion (as shown) of the Figure. Here, the object is shown to include, as its first byte, a field 84 that identifies the length of its associated WSID. Again, the WSID field is coded, e.g., as an SMS default, seven-bit coded alphabet as defined in 3GPP TS 23.038 [5] with bit number eight set to zero. The string is left-justified. Unused bytes are set to values of FF.

Figures 6, 7:
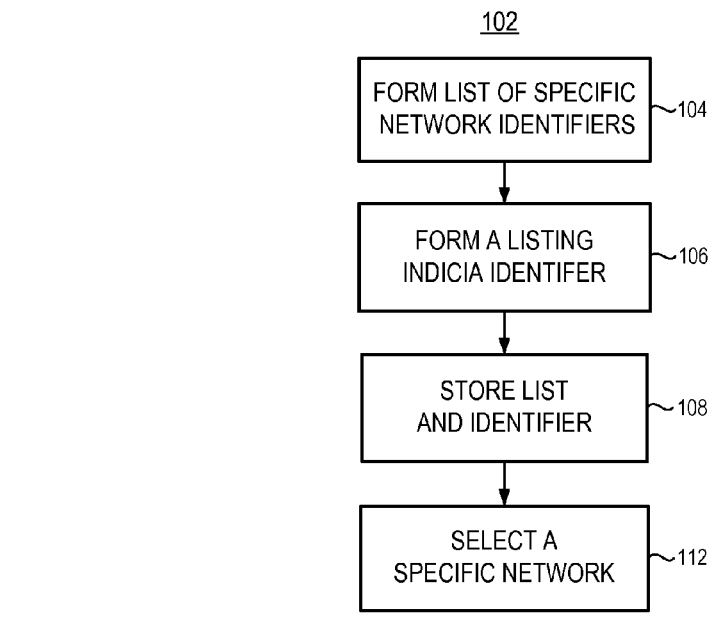
FIG. 6 illustrates a representation, similar to those shown in FIGS. 2-5, but here of a file including a WSID list formed pursuant to another embodiment of the present invention.
FIG. 7 illustrates a method flow diagram listing the method of operation of an embodiment of the present invention.

FIG. 6 illustrates a file 38 of another alternate embodiment. Here, again, the file includes the fields 52-66. In this implementation, a first two-byte field 68 identifies the length of the WSID list. Then, a byte 76 prefaces each associated WSID with the length of the associated WSID of the list 72. Two bytes are thereby assigned to describe the length of the file and the WSID list is structured to be coded as length, data. The WSID list is coded as an SMS default seven-bit coded alphabet as defined in 3GPP TS 23.038 [5] with bit number eight set to zero. The string is left-justified.

In each of the implementations, the WSIDs form SSIDs coded in conformity with 3GPP TS 23.038. And, the file and the fields forming and defining the file are maintained at a memory element formed of removable or permanent memory of the user equipment. The memory element, as noted above, is any of an SIM, a USIM, a R-UIM, a compact flash memory, an SD card, an other type of removable memory, or any type of permanent memory, such as RAM.

The below table is the body of a (U/I)SIM EF.

| Bytes | Description | M/O | Length |
|---|---|---|---|
| 1 to N | WSID Headers | M | X1 bytes |
| N + 1 to N + L1 | $WSID_1$ | O | X2 bytes |
| $N + L_1 ... + L_{N-1} + 1$ to $N + L_1 + ... + L_n$ | $WSID_n$ | O | Xn bytes |

N: The number of the WSIDs

| | WSID Headers | | |
|---|---|---|---|
| Bytes | Description | M/O | Length |
| 1 | $WSID_1$ header | M | 1 byte |
| 2 | $WSID_2$ header | O | 1 byte |
| N | $WSID_N$ header | O | 1 byte |

WSID header
Length 1 byte:

| Bit 7 | Bit 6 | Bit 5 | Bit 4 | Bit 3 | Bit 2 | Bit 1 | Bit 0 |
|---|---|---|---|---|---|---|---|
| EB | | | | Li | | | MHI |

Li: Length in bytes of WSID I – 1, where i = 1 ... N. Li can have values between 00000 and 11111. Value 00000 indicates 1 byte long WSID and value 11111 means 32 bytes long WSID
EB: Extra 2 Bits: reserved for future use, used, e.g., to store information about the WSID coding
HI: More Header Indicator

| MHI value | Meaning |
|---|---|
| 0 | Next byte contains the first byte of the first WSID |
| 1 | Next byte is a WSID header |

WSID
Contents:
WLAN specific identifier (WSID) as defined in TS 24.234 [40].

It is noted that the above tables that identifies bits 7-0 is just one example, in the fields (HI, EB, LI) can, in other implementations, can be coded in any order. Furthermore in another embodiment a number of bits could be selected to indicate the coding of the WSID.

| Bit X | Bit Y | Character set: |
|---|---|---|
| 0 | 0 | GSM 7 bit default alphabet |
| 0 | 1 | 8 bit data |
| 1 | 0 | UCS2 (16 bit) [10] |

FIG. 7 illustrates a method, shown generally at 102, representative of the method of operation of an embodiment of the present invention. The method facilitates network selection at a wireless device.

First, and as indicated by the block 104, a listing of specific network identifiers is formed. Each specific network identifier identifies a network permitted to be selected. Then, and as indicated by the block 106, a listing indicia identifier is formed. The identifier identifies formatting of the specific network identifiers of the listing of specific network identifiers. And, as indicated by the block 108, the listing of specific network identifiers and the listing indicia identifier are stored at an electronic memory of the wireless device.

Thereafter, and as indicated by the block 112, the network is selected responsive to accessing and analysis of the stored information.

The previous descriptions are of preferred examples for implementing the invention, and the scope of the invention should not necessarily be limited by this description. The scope of the present invention is defined by the following claims.

What is claimed is:

1. User equipment apparatus for facilitating the selection of a network from a plurality of networks that conform to and provide communications to the same user equipment apparatus using different communication standards, each network having a unique identifying network identifier with a file length, the user equipment apparatus comprising:
   an electronic storage element storing a plurality of network identifiers in at least one of a user controlled specific network identifier and an operator controlled specific network identifier list, each network identifier of said plurality of network identifiers having a file length shortened from the file length of the identifying network identifier and stored in said at least one list without an indication of a file length of the plurality of network identifiers, said stored network identifiers being capable of being a variable length and identifying a particular network permitted for communication to be selected by the user equipment from among the plurality of networks, at least one of which conforms to a first communication standard and at least one of which conforms to a different second communication standard; and
   a numerical representation of the number of network identifiers stored as a first byte of said at least one list and adjacent at least one of said plurality of stored network identifiers at said electronic storage element, said numerical representation being configured to identify to the user equipment apparatus the number of said network identifiers stored at said electronic storage element, one network identifier being separated from another network identifier by a predetermined delimiter between them.

2. The user equipment apparatus of claim 1 wherein said electronic storage element comprises a portable storage card containing electronic memory.

3. The user equipment apparatus of claim 1 wherein said electronic storage element comprises a permanent user-equipment electronic memory.

4. The user equipment apparatus of claim 1 wherein said numerical representation comprises a file length of one byte.

5. The user equipment apparatus of claim 1 wherein each network identifier of said plurality of network identifiers comprises a service set identifier (SSID).

6. The user equipment apparatus of claim 1 wherein said delimiter is a hexadecimal value of FF.

7. The user equipment apparatus of claim 1 wherein said shortened file length further comprises a file length shortened by coding.

8. The user equipment apparatus of claim 7 wherein said coded shortened file length further comprises a file length shortened by an SMS (short message service) coded alphabet.

9. A method for facilitating interworking wireless local area network, I-WLAN, selection at a user equipment device that is capable of communicating through wireless local area networks that conform to different communication standards, each network having a unique identifying WLAN identifier with a file length, said method comprising the operations of:
   forming a user controlled specific network identifier list of WLAN identifiers, WSIDs, and an operator controlled specific network identifier list of WSIDs, each of said lists having a file length shortened from the file length of the identifying WLAN identifier and stored without an indication of a file length of the WSIDs, each of the WSIDs being capable of having a variable length and identifying a respective I-WLAN permitted to be selected by the user equipment device, at least one of which conforms to a first communication standard and at least one of which conforms to a second communication standard;

forming a numerical representation of the number of WSIDs for each list permitted to be used by the user equipment device; and storing both the file length shortened WSIDs and the numerical representation of the number of stored WSIDs in each list, said numerical representation being stored as a first byte of each said list and said WSIDs being stored immediately following said numerical representation in an electronic memory of the user equipment device such that the WSIDs are separated from each other in the electronic memory by a delimiter.

10. The method of claim 9 further comprising the operation of selecting a WSID by accessing the numerical representation of WSIDs.

11. The method of claim 9 further comprising the operation of coding the WLAN identifiers in the WSIDs.

12. The method of claim 11 wherein the operation of coding the WLAN identifiers in the WSIDs further comprises the operation of coding by an SMS (short message service) coded alphabet.

13. The method of claim 9 further comprising the operation of separating WSIDs from each other in the electronic memory with delimiters having a hexadecimal value of FF.

14. Apparatus for a user equipment by which to facilitate network selection from a plurality of networks that conform to and provide communications to the user equipment using different communication standards, each network having a unique identifying network identifier with a file length, said apparatus comprising:

a memory element (a) that stores a listing of a plurality of network identifiers in at least one of a user controlled specific network identifier and an operator controlled specific network identifier list, each network identifier of said plurality of network identifiers having a file length shortened from the file length of the identifying network identifier and stored without an indication of a file length of the plurality of network identifiers, said stored network identifiers being capable of being a variable length and each said stored network identifier identifying a particular network permitted for communication to be selected by the user equipment from among the plurality of networks, at least one of which conforms to a first communication standard and at least one of which conforms to a different second communication standard, and (b) that stores a numerical representation of the number of network identifiers in said stored listing as a first byte of said listing and adjacent to at least one of said plurality of stored network identifiers; and a memory element accessor configured to access the listing and a network identifier in said memory element pursuant to network selection.

15. The apparatus for a user equipment of claim 14 wherein said memory element further comprises predetermined delimiters that separate each said stored network identifier one from another.

16. The apparatus for a user equipment of claim 15 wherein one of said predetermined delimiters is a hexadecimal value of FF.

17. The apparatus for a user equipment of claim 15 wherein said shortened file length is shortened by coding.

18. The apparatus for a user equipment of claim 17 wherein said coded shortened file length further comprises a file length shortened by an SMS (short message service) coded alphabet.

* * * * *